(12) United States Patent
Peters

(10) Patent No.: US 6,675,661 B1
(45) Date of Patent: Jan. 13, 2004

(54) DEVICE FOR MEASURING THE VOLUME FLOW OF A FLUID IN A PIPE

(75) Inventor: Marinus Carolus Adrianus Maria Peters, Breda (NL)

(73) Assignee: Nederlandse Organisatie voor toegepast-natuurwetenschappelijk Onderzoek TNO, Delft (NL)

( * ) Notice: Subject to any disclaimer, the term of this patent is extended or adjusted under 35 U.S.C. 154(b) by 0 days.

(21) Appl. No.: 09/744,566
(22) PCT Filed: Aug. 2, 1999
(86) PCT No.: PCT/NL99/00493
§ 371 (c)(1),
(2), (4) Date: Jun. 1, 2001
(87) PCT Pub. No.: WO00/08420
PCT Pub. Date: Feb. 17, 2000

(30) Foreign Application Priority Data

Aug. 3, 1998 (NL) .............................................. 1009797

(51) Int. Cl.$^7$ ................................................. G01F 1/32
(52) U.S. Cl. ................................................... 73/861.22
(58) Field of Search ........................ 73/861.22, 861.18, 73/861.63, 861.24, 861.23

(56) References Cited

U.S. PATENT DOCUMENTS

| 4,485,679 A | * | 12/1984 | Pitt et al. ................. 73/861.22 |
| 5,150,619 A | * | 9/1992 | Turner et al. ............ 73/861.22 |
| 5,247,838 A | * | 9/1993 | Vander Heyden et al. .......... 73/861.22 |
| 6,003,384 A | * | 12/1999 | Frohlich ................... 73/861.22 |
| 6,053,053 A | * | 4/2000 | Huotari ................... 73/861.22 |
| 6,058,787 A | * | 5/2000 | Hughes .................... 73/861.63 |

OTHER PUBLICATIONS

Assembled by Milton Van Dyke "An Album of Fluid Motion" Department of Mechanical Engineering, Stanford University; 1982.
M. Peters, et al.; "Impact of Pulsations on Vortex Flowmeters"; FLOMEKO '98, Lund, Sweden, Jun. 17, 1998; pp. 1–6.

* cited by examiner

Primary Examiner—Edward Lefkowitz
Assistant Examiner—Jewel V. Thompson
(74) Attorney, Agent, or Firm—Norris McLaughlin & Marcus

(57) ABSTRACT

A device for measuring the volume flow of a fluid in a pipe comprises at least two objects to be arranged in the pipe. By means of sensors, the frequencies can be determined with which vortices occur which arise behind the respective objects upon the fluid flowing round the objects. The objects are of so different a shape and/or diameter that at least one of the vortex frequencies thereby determined is independent of a pulsation frequency possibly arising in the approach velocity of the fluid. A sensor is present for determining this pulsation frequency, while further means are present for determining the approach velocity from that vortex frequency or those vortex frequencies for which it holds that the ratio between the vortex frequency and the pulsation frequency lies outside an interval (0.4, 2.5).

6 Claims, 2 Drawing Sheets

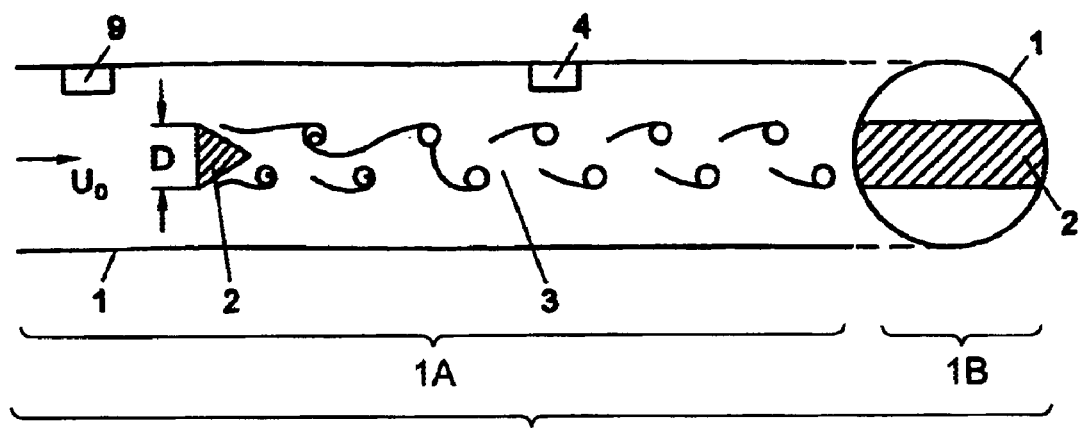
F I G. 1
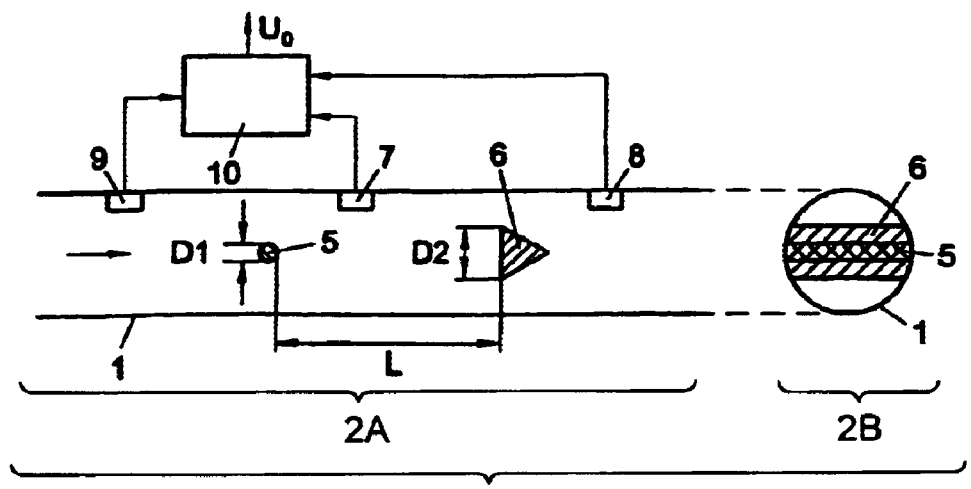
F I G. 2
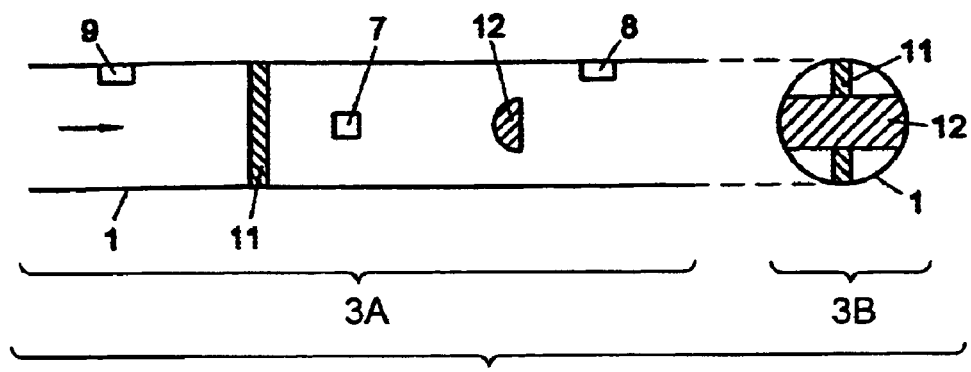
F I G. 3

DEVICE FOR MEASURING THE VOLUME FLOW OF A FLUID IN A PIPE

BACKGROUND OF THE INVENTION

The present invention relates to a device for measuring the volume flow of a fluid in a pipe, comprising At least two objects with a different shape and/or diameter to be arranged in the pipe, a sensor for determining the frequency with which vortices occur which arise behind the objects upon the fluid flowing round the objects and means for determining the volume flow of the fluid from this frequency.

Such a device is known from DE-A-37 14 344.

In said document the vortex flow meter comprises two objects, or better said one object, which is splitted in two parts of different form. The purpose of this object (these two parts) is to provide for only one vortex frequency measurement. The two parts of the object must have substantially equal measures. Although in said document the occurrence of more vortex frequencies are described, the construction is directed to suppress the high frequency components by rounding off the corners of the object so that only one vortex frequency component results.

By placing an object in a fluid flow, a so-called Von Karman vortex street forms behind this object upon circumfluence of this object by the fluid. Such a vortex street is depicted in, for instance, Milton van Dyke, *An Album of Fluid Motion* (Stanford University, California, 1982. Depending on the shape and dimensions of the object, vortices arise in the fluid with a certain frequency. In general, this frequency $f_v$ can be represented by the following relation:

$$f_v = \left(\frac{S_r}{D}\right) * U_0$$

wherein $S_r$ forms the Strouhal number determined by the shape of the object, D represents the diameter of the object, that is, the distance over which the fluid flow is interrupted by the object, and $U_o$ represents the approach velocity of the fluid flowing towards the object. By measuring, with a known approach velocity, the frequency of the vortices, for every object the associated Strouhal number can be determined. Over a certain interval, the Strouhal number is found to be substantially independent of the Reynolds number Re and to have a constant value; this Reynolds number has the following relation with the above-mentioned approach velocity $U_o$:

$$Re = \frac{\rho U_0 d}{\eta}$$

wherein $\rho$ represents the density of the fluid, d represents the diameter of the pipe through which the fluid is led and $\eta$ represents the dynamic viscosity of the fluid. Accordingly, within the interval referred to, because the Strouhal number is independent of the fluid density and the viscosity of the fluid, there is a linear relation between the vortex frequency $f_v$ and the approach velocity $U_o$, as represented hereinbefore.

When the approach velocity is not constant, however, problems may arise in such a volume flow measuring device. Due to variations in the approach velocity presented, pulsation frequencies arise therein. The problems referred to here are dependent on the ratio between the pulsation frequency $f_p$ in the approach velocity presented and the vortex frequency $f_v$. From the article by M. C. A. M. Peters et al., Impact of pulsations on vortex flowmeters, Paper presented at FLOMEKO'98, Lund, Sweden Jun. 15–17, 1998, it appears that when $f_v/f_p<0.4$ and $f_v/f_p>2.5$, the vortex frequency $f_v$ is found to take a value that corresponds to a vortex frequency associated with an approximately average approach velocity. In both cases, there is a unique linear relation between vortex frequency and approach velocity, and the latter quantity can be determined by measurement of the vortex frequency. When, by contrast, it holds that $0.4<f_v/f_p<2.5$, so-called lock-in phenomena occur. "Lock-in" means that within defined limits, with variations in the approach velocity, the vortex frequency remains the same, that is, the vortex frequency within these limits is strongly dominated by the pulsation frequency in the approach velocity. From the article referred to, in particular FIGS. 11 and 12, it appears that these vortex frequencies dominated by the pulsation frequency occur at $f_v/f_p$ ratios of ½, 1, 1½ and 2. At amplitudes in the pulsation frequency of about 5% of the approach velocity, the errors in the measured vortex frequency are found to lie between +8% and −18%. Such errors lead to equal errors in the approach velocity to be determined. Accordingly, at a pulsating approach velocity with $0.4<f_v/f_p<2.5$, the known approach velocity measuring devices of the type set forth in the preamble are highly unreliable.

SUMMARY OF THE INVENTION

The object of the invention is to obviate this disadvantage and to provide a device of the type described in the preamble which, also for random pulsations, still enables an accurate determination of this approach velocity.

To that end, according to the invention, the device such as it is described in the preamble is characterized in that at least two objects of so different a shape and/or diameter are present that at least one of the vortex frequencies thereby determined is independent of a pulsation frequency possibly arising in the approach velocity of the fluid.

By placing two objects of a different shape and/or diameter in the pipe, the $S_r/D$ ratio for the two objects can be chosen to be so different that for a given pulsating approach velocity at least one of the two vortex frequencies has a value such that the $f_v/f_p$ ratio comes to lie outside the interval (0.4, 2.5). Only from such a vortex frequency can a correct approach velocity be determined. Obviously, this requires the presence of a sensor to determine the pulsation frequency. In many cases, for both vortex frequencies the $f_v/f_p$ ratio will lie outside this interval; in such a situation, by measurement of the vortex frequency in each of the two vortex streets, the same value for the approach velocity will be obtained. Although, of course, more than two objects may be placed in the pipe, this is basically unnecessary, and in practice only two objects will suffice.

The two objects referred to can be arranged after each other, while choosing the mutual distance to be sufficiently great to keep any mutual interaction of the two objects as small as possible. Such interaction can also be minimized by arranging the two objects crosswise in the pipe. The objects can be arranged not only behind each other, but also next to each other, again subject to the requirement that their mutual distance be sufficiently great to reduce interaction between the objects to a minimum. In addition, it is also possible, certainly when the diameter of the pipe is great relative to the dimensions of the objects, to design the two objects as one whole.

Both the measurement of the vortex frequency and the measurement of the pulsation frequency are done by means of pressure sensors which are arranged at a suitable point on or in the wall of the pipe, although it is also possible for the sensors determining the vortex frequency to be arranged in or on the respective objects, since the vortices induce a force acting on the objects that can be measured. Further, it is possible to integrate the sensor for determining the pulsation frequency into one of the sensors or into both sensors for determining the vortex frequency.

BRIEF DESCRIPTION OF THE DRAWINGS

The invention will now be further explained with reference to the accompanying drawings, wherein:

FIGS. 1A and 1B schematically show a longitudinal section and a cross section, respectively, of a device according to the prior art for measuring the volume flow of a fluid in a pipe;

FIGS. 2A and 2B schematically show a longitudinal section and a cross section, respectively, of a first exemplary embodiment of the device according to the invention;

FIGS. 3A and 3B schematically show a longitudinal section and a cross section, respectively, of a second exemplary embodiment of the device according to the invention;

Corresponding parts in the figures are indicated by the same reference numerals.

DESCRIPTION OF THE PREFERRED EMBODIMENTS

Figure 4:
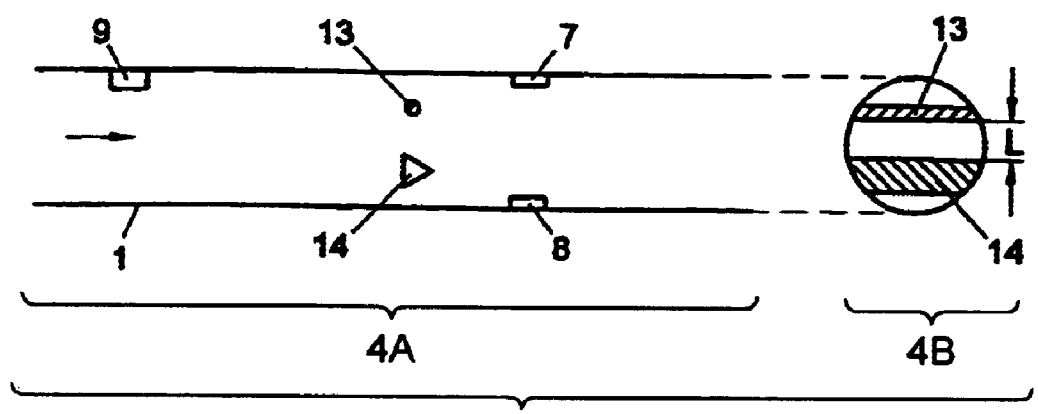
FIGS. 4A and 4B schematically show a longitudinal section and a cross section, respectively, of a third exemplary embodiment of the device according to the invention.

FIG. 1 shows a pipe 1, in which an object 2 is arranged. The object 2 extends throughout the diameter of pipe 1 and has a triangular cross section of a diameter D. When in the direction indicated by the arrow P a fluid of an approach velocity $U_o$ is led through pipe 1, a so-called Von Karman vortex street 3 develops over a certain length behind the object 2. The frequency with which the vortices in this vortex street are generated, that is, the vortex frequency, is determined by the shape and the diameter D of the object 2. This frequency $f_v$ is measured by a pressure sensor 4 on the inside wall of pipe 1. The above-mentioned approach velocity $U_o$ to be determined is proportional to the vortex frequency $f_v$. The proportionality constant is determined by calibration with a known approach velocity.

As has already been set out hereinbefore, this construction leads to problems if the approach velocity is pulsed with a pulsation frequency $f_p$ where $0.4 < f_v/f_p < 2.5$. For this reason, two objects of different shape and/or diameter have been arranged in the pipe.

In FIG. 2, a first object 5 of a circular cross section and a diameter $D_1$, and a second object 6 of a triangular cross section and a diameter $D_2$ have been arranged in pipe 1. Both objects extend throughout the diameter of the pipe, behind each other. The device is here provided with two sensors 7 and 8 for measuring the vortex frequencies $f_{v1}$ and $f_{v2}$ in the Von Karman vortex streets arising behind the respective objects. The shape and the diameter of the objects 5 and 6 are different, such that the $S_{r1}/D_1$ ratio differs from the $S_{r2}/D_2$ ratio to such an extent that the vortex frequencies differ by at least about a factor of 6. $S_{r1}$ and $S_{r2}$ are the Strouhal numbers of the objects 5 and 6, respectively.

Because the vortex frequencies $f_{v1}$ and $f_{v2}$ differ by at least about a factor of 6, always at least one of the ratios $f_{v1}/f_p$, $f_{v2}/f_p$ will lie outside the interval (0.4, 2.5), and so an accurate measurement of one of the vortex frequencies, and hence an accurate determination of the approach velocity proportional thereto, will always be possible. To be able to select the correct ratio, a pressure sensor 9 is present to enable determination of the pulsation frequency $f_p$ of the fluid flow. Further, means 10 are present, for instance comprising a microprocessor, to determine the approach velocity from the signals coming from the pressure sensors 7, 8 and 9. In fact, eligible as a measure for the approach velocity is only the vortex frequency, or are only the vortex frequencies, for which the ratio(s) between the vortex frequency and the pulsation frequency lies or lie outside the interval (0.4, 2.5). To prevent the occurrence of interaction between the two objects 5 and 6 whereby the Von Karman vortex street behind the object 5 is disturbed by the object 6, the distance L between the objects should be chosen to be sufficiently large. Obviously, this distance will be dependent on the shape and diameter of the objects.

FIG. 3 shows a second exemplary embodiment of the device according to the invention. The two objects 11 and 12 are here arranged in the pipe 1 so as to cross each other perpendicularly. The object 11 has a circular cross section, while the object 12 has a semicircular cross section; both objects again extend throughout the diameter of pipe 1. By virtue of the mutually crossing arrangement of the objects, any interaction between the two objects is minimized, even if the distance between the two objects is relatively small. The shape and diameter of the objects here differ so much from each other again that, as in the first exemplary embodiment, the measured vortex frequencies differ by at least about a factor of 6.

FIG. 4 shows two objects 13 and 14 arranged next to each other in the pipe. The objects have a circular and a triangular cross section, respectively, and different diameters, and extend parallel to each other in the pipe 1. The mutual distance l between the objects has been selected to be so large that any interaction between the objects is minimized. Here too, the shape and diameter of the two objects are so different again that the vortex frequencies in question differ by at least about a factor of 6.

Figure 5:
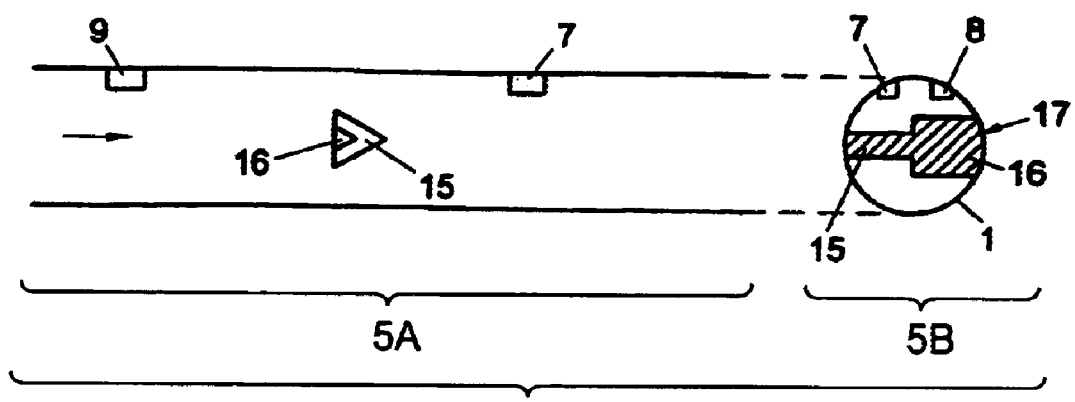
FIGS. 5A and 5B schematically show a longitudinal section and a cross section, respectively, of a fourth exemplary embodiment of the device according to the invention.

In the exemplary embodiments described so far, both the shape and the diameter of the two objects are different. Also possible, however, are embodiments where the shape alone or the diameter alone of the object is different. FIG. 5 gives an example of an embodiment in which the two objects have the same shape but differ in diameter. The two objects 15 and 16 are arranged next to each other here and form one whole 17 with each other. The pressure sensors for measuring the vortex frequencies are likewise arranged next to each other here. Owing to the different diameters of the objects 15 and 16, here too, again, vortex frequencies are measured that differ from each other by at least about a factor of 6.

The invention is not limited to the exemplary embodiments presented here, but encompasses all kinds of modifications thereof, naturally insofar as they fall within the scope of protection of the appended claims. As already noted hereinbefore, it is possible for the sensors for determining the vortex frequencies to be arranged in or on the objects in question, instead of in or on the wall of pipe 1. It is also possible, as has already been mentioned before, to integrate the sensor for determining the pulsation frequency into a sensor for determining the vortex frequency. Further, all kinds of shapes and dimensions other than those presented here are possible, as long as the measured vortex frequencies differ from each other by such an amount that at least one of these frequencies is independent of a pulsation frequency that may arise in the approach velocity of the fluid.

What is claimed is:

1. Device for measuring the volume flow of a fluid in a pipe, comprising at least two objects with a different shape and/or diameter to be arranged in the pipe, a sensor means for determining the frequency with which vortices occur which arise behind the objects upon the fluid flowing round the objects, and means for determining the volume flow of the fluid from this frequency, wherein the sensor means comprises (a) at least first and second sensors for measuring the vortex frequencies ($f_{v1}$ and $f_{v2}$) corresponding with each of said at least two objects, and
   (b) a third sensor for determining a possible pulsation frequency arising in the approach velocity of the fluid, the difference in shape and/or diameter of the at least two objects being such that, at all possible pulsation frequencies, at least one of the vortex frequencies is independent of the pulsation frequency.

2. The device according to claim 1, wherein means are provided, in which, in response to signals from the first, second and third sensors, the approach velocity is determined from that vortex frequency, or those vortex frequencies, for which it holds that the ratio between the vortex frequency and the pulsation frequency lies outside the interval between 0.4 and 2.5.

3. The device according to claim 1, wherein, seen in the flow direction, the two objects are arranged one behind the other.

4. The device according to claim 1, wherein, seen in the flow direction, the two objects appear to be crossing each other.

5. The device according to claim 1, wherein, seen in the flow direction, the two objects are located next to each other.

6. The device according to claim 5, wherein, seen in the flow direction, the two objects located next to each other form one unitary object.

* * * * *